[11] 3,589,796

| | | | |
|---|---|---|---|
| [72] | Inventor | Carl F. Schaefer Westport, Conn. | |
| [21] | Appl. No. | 580,381 | |
| [22] | Filed | Sept. 19, 1966 | |
| [45] | Patented | June 29, 1971 | |
| [73] | Assignee | United Aircraft Corporation East Hartford, Conn. | |

| | | | | |
|---|---|---|---|---|
| 2,872,840 | 2/1959 | Stanton | | 88/1 |
| 3,230,819 | 1/1966 | Noxon | | 81/1 (UX) |
| 2,633,051 | 3/1953 | Davis | | 356/251 |
| 2,895,372 | 7/1959 | Tacklind et al. | | 356/252 |
| 3,182,545 | 5/1965 | Papke | | 88/1.5 |

Primary Examiner—David H. Rubin
Attorney—Shenier & O'Connor

[54] COLLIMATED VIEWING SYSTEM
7 Claims, 2 Drawing Figs.

[52] U.S. Cl. ................................. 350/174, 350/201, 350/204, 350/296
[51] Int. Cl. ................................. G02b 23/10, G02b 27/10
[50] Field of Search .......................... 178/6, 7.8, 7.85, 7.88; 88/1; 350/174, 181, 182, 193, 201, 29, 296, 204; 35/12; 356/251, 252

[56] References Cited
UNITED STATES PATENTS
2,362,611  11/1944  Brown .......................... 350/193

ABSTRACT: An optical system for presenting an observer at a viewing position with a view of the outside scene and with a view of an image of an interior scene in which an image combiner mounted between the viewing position and the outside scene forms a negative lens and a positive mirror with relation to a cathode-ray tube phosphor, for example, located below the combiner axis to provide an observer with an aplanatic image of the phosphor. An astigmatic element is disposed between the phosphor and the combiner for correcting the phosphor image for astigmatism. The combiner body comprises a portion spaced outwardly from the partially reflecting surface-forming mirror to compensate for the lens effect of the rest of the combiner on the image of the outside scene.

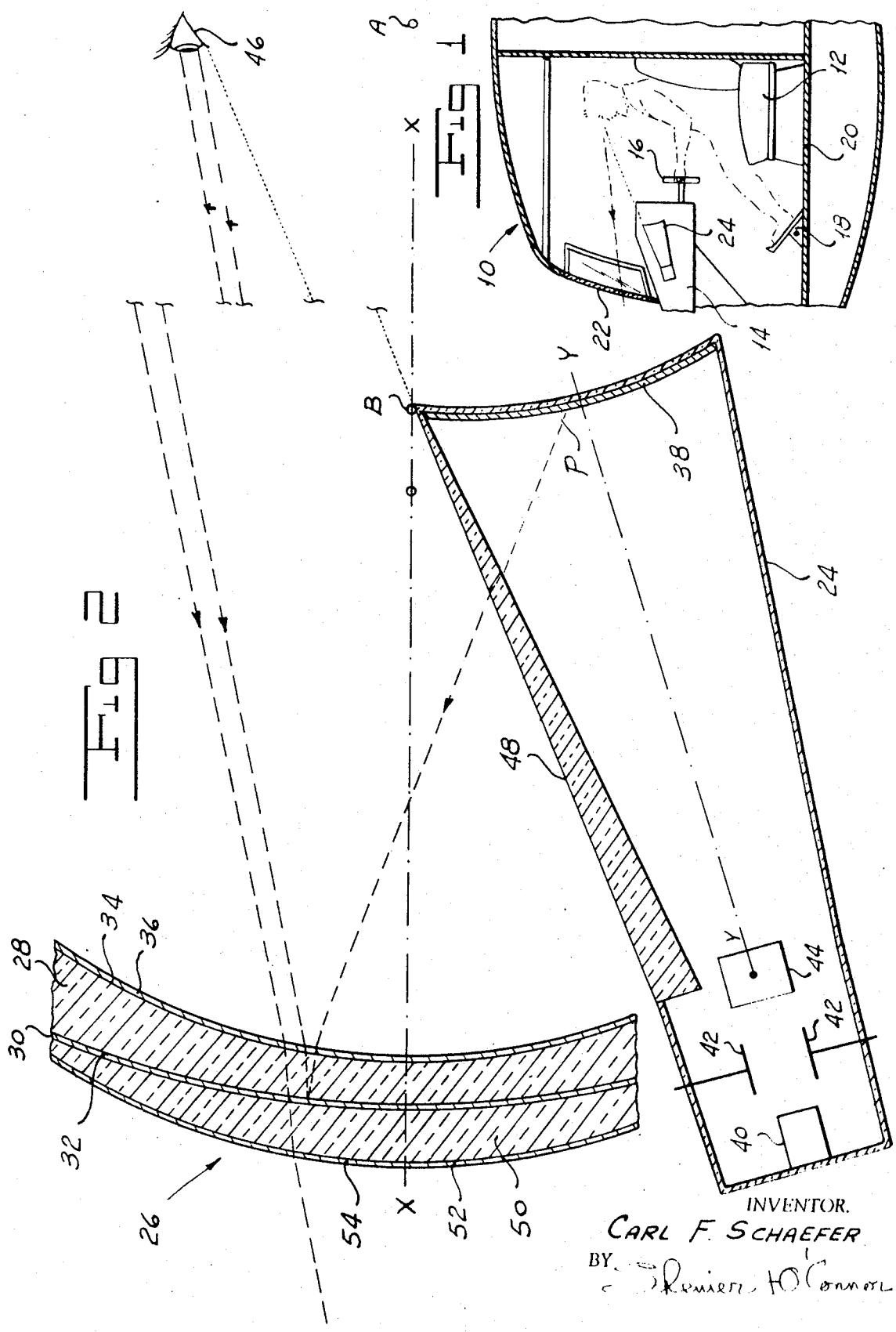

3,589,796

COLLIMATED VIEWING SYSTEM

BACKGROUND OF THE INVENTION

It will readily be appreciated that at landing breakthrough, a pilot has a natural tendency to direct his attention to the outside scene rather than to instruments or the like. Various optical systems are known in the prior art for providing the pilot of an aircraft, for example, with a view both of the outside scene and of an image of an instrument in his normal, head-up viewing position to assist him in operating the aircraft, particularly on landing. Specifically it has been suggested in the prior art that an image combining mirror be employed at the pilot's normal viewing position in combination with a system of lenses for forming an image of the face of a cathode-ray tube, for example, on the reflecting surface of the combiner. Systems of this type, while partially successful, embody a number of defects. They are relatively complicated, occupy an excessive amount of space and are expensive.

The copending application of Irving R. Abel and Thomas D. Kegelman, Ser. No. 385,880, filed July 29, 1964, now U.S. Pat. No. 3,446,916 issued May 27, 1969, discloses a collimated viewing system for overcoming many of the problems of the systems of the prior art pointed out hereinabove. While the system disclosed in the copending application is relatively compact and less expensive than are systems of the prior art, it also embodies a number of defects. First, spherical aberrations are not corrected to the extent which is desirable in a system of that type. Astigmatism is not minimized to the extent that is desirable. Moreover, the geometry of the system is such that only half of the possible reflecting surface is effectively employed.

I have invented a collimated viewing system which overcomes the defects of viewing systems of the prior art. I so construct my system that spherical aberration and coma are minimized. My system is corrected for astigmatism. It permits more efficient use of the reflecting surface of the image combiner of the system.

DESCRIPTION OF THE INVENTION

One object of my invention is to provide an improved collimated viewing system which overcomes the defects of viewing systems of the prior art.

Another object of my invention is to provide an improved collimated viewing system wherein both spherical aberration and coma are minimized.

A further object of my invention is to provide an improved collimated viewing system which is corrected for astigmatism.

Yet another object of my invention is to provide an improved collimated viewing system which makes efficient use of the reflecting surface of an image combiner.

Other and further objects of my invention will appear from the following description.

In the accompanying drawings which form part of the instant specification and which are to be read in conjunction therewith and in which like reference numerals are used to indicate like parts in the various views:

FIG. 1 is a schematic view illustrating the orientation of my improved collimated viewing system in use in an aircraft cabin.

FIG. 2 is a diagrammatic view of my improved collimated viewing system illustrating the relationship between the parts and drawn on an enlarged scale.

Referring now to the drawings, by way of example I have shown my system in an aircraft cabin indicated generally by the reference character 10 wherein the pilot's seat 12 is located just behind the control panel support 14 on which the control wheel 16 is mounted. The rudder pedals 18 are located on the cabin floor 20 in a position at which they can be operated by the pilot. It will readily be understood that space within the cabin 10 is limited and that the instruments which the pilot is to use must be so located as not to interfere with his view through the cabin window 22.

One of the instruments provided to assist the pilot in operating the aircraft, particularly on landing, may be a cathode-ray tube 24 for presenting the pilot with an image of terrain being approached. As has been pointed out hereinabove, it is desirable that the pilot be able to view not only the outside scene but also the picture presented by the tube 24.

In my improved collimated viewing system I provide a compound image combiner indicated generally by the reference character 26 which may be located in and form a part of the window 22 in the field of view of the pilot as he looks through the window. My combiner includes a first or inner body portion 28 formed of a suitable transparent material such as glass or clear plastic of optical quality. I apply a partially reflective coating 30 to the outer surface 32 of the combiner portion 28. Coating 30 may be a very thin film of aluminum.

The inner surface 34 of the combiner portion 28 preferably is provided with a suitable antireflection coating 36 of a material such as magnesium fluoride. For reasons which will be described more fully hereinbelow, surfaces 32 and 34 are curvilinear surfaces with the surface 34 having a greater curvature than does the surface 32. I have indicated the optical axis of the combiner 26 by the line X-X in FIG. 2.

I mount the cathode-ray tube 24 on the support 14 with the axis Y-Y of the tube making an acute angle with the optical axis X-X. Tube 24 includes a phosphor 38 on which the image to be viewed is formed, as well as the usual electron gun 40 and vertical and horizontal deflection plates 42 and 44.

In the particular arrangement illustrated in FIG. 2 I have shown the surface 32 as being generally spherical or circular in cross section with the center at the point A. The surface 34 similarly is spherical or circular in cross section having its center at a point B on the axis X-X. The phosphor 38 is located below the axis X-X in such a position as to permit an image thereof to be reflected toward the pilot'x eye 46 in the normal viewing position.

In the system thus far described the combiner portion 28 acts as a negative lens and the coating 30 on surface 32 acts as a positive mirror with relation to the image presented on the phosphor 38. In effect the system acts somewhat as a Mangin mirror which, as is known in the art, is an aplanatic system which corrects both for spherical aberration and for coma. I have discovered that the operation of the system in reducing these two effects can be enhanced by making the surfaces 32 and 34 slightly aspherical. The degree to which the surfaces depart from the spherical is determined empirically.

While the combination of the negative lens 28 and the positive mirror provided by the coating 30 minimize both spherical aberration and coma, they do not eliminate astigmatism. Astigmatism can be controlled by making the field angles as small as possible. In the system disclosed in the copending application, the phosphor of the cathode-ray tube is located below the optical axis of the system and the tube axis generally is parallel to the system axis. This arrangement, however, limits the size of the usable field and requires a relatively large aperture resulting in excessive thickness of the combiner. In my system I orient the tube 24 with the axis Y-Y making an acute angle with the optical axis of the system so as to increase the usable field of the combiner. With the arrangement shown the outer surface of window 48 is on a line with the observer's eye 46 in the normal viewing position. I have discovered that for best results in reducing spherical aberration and coma, the phosphor 38 is located immediately below the optical axis of the system adjacent the point B.

While the orientation of the tube 24 permits more effective use of the curved surface of the combiner without blocking the view of the observer, the astigmatism of the system is not corrected. I overcome this problem by making the window 48 through which the phosphor image is viewed an astigmatic element. Specifically I make the element 48 an optical wedge, the thicker end of which is adjacent the combiner. This arrangement minimizes astigmatism in the system. I have also discovered that the effect of the window 48 in reducing astigmatism can be enhanced by making one or both surfaces thereof nonplanar. One surface of the window might be made cylindrical, for example, with relation to an axis lying in the plane of the paper. It might also be made curvilinear with relation to such an axis though not strictly cylindrical. The effect of astigmatism may moreover further be reduced by making one or both surfaces curvilinear with relation to an axis perpendicular to the paper. The particular curvature of the window surfaces to obtain the optimum reduction of astigmatism would be determined empirically. It is to be understood that the wedge shape of the window is the most significant factor in reducing astigmatism.

Thus far I have described the characteristics of my system in presenting to the viewer a collimated image of the phosphor 38. The negative lens 28 and positive mirror at surface 32 minimize spherical aberration and coma. The wedge-shaped window 48 minimizes astigmatism while permitting the curvature of the combiner more effectively to be used. While the system effectively accomplishes the desirable result of providing a collimated image of the phosphor 38, the portion 28 of the combiner acts as a lens with relation to the outside scene and would introduce distortion therein. I provide the combiner with an outer portion 50 having a curved outer surface 52. Preferably I coat surface 52 with a nonreflective coating 54 of a suitable material such as magnesium fluoride. I so shape the surface 52 as to reduce the distortion of the outside image which otherwise would result from the combiner portion 28. In order to achieve this result, surface 52 is generally parallel to the surface 34. Again it may be found empirically that a slight departure from spherical of the surface 52 will serve further to reduce the distortion.

In operation of my improved viewing system a light ray from a point, such as the point P, on the phosphor is refracted in passing through the combiner portion 28 toward the reflective coating 30. At the coating it is reflected and again refracted as it passes out of the section 28 and travels toward the observer's eye 46. The effect of the combiner section 28 and the reflective coating 30 is that of a negative lens and a positive mirror which serve to minimize both spherical aberration and coma. The orientation of the tube 24 and the positioning of the phosphor 38 permit most effective use of the curvature of the reflective coating 30 while optimizing the reduction of spherical aberration and coma without interfering with the observer's view of the outside scene. While accomplishing these desirable results, the arrangement would introduce astigmatism in the absence of the wedge-shaped window 48. This window minimizes astigmatism with the result that a collimated image of the phosphor is presented to the observer.

While the arrangement of the negative lens and positive mirror in combination with the window 48 provide a collimated image of the phosphor, the view of the outside scene would be distorted by the combiner section 28 were it not for my provision of the section 50 having a curvilinear surface 52 which is generally parallel to the surface 34. This arrangement presents the viewer with an undistorted view of the outside scene.

As has been explained hereinabove, I may make the surfaces 32, 34 and 52 slightly aspheric as determined empirically for optimum results. Moreover, the surface or surfaces of the window 48 may be slightly curved to achieve optimum results.

It will be seen that I have accomplished the objects of my invention. I have provided an improved collimated viewing system which overcomes the defects of systems of the prior art. My system overcomes spherical aberration and coma while avoiding the introduction of astigmatism into the system. It permits more effective use of the curvature of the system image combiner. It avoids distortion of the outside scene.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A viewing system for presenting an observer having a line of sight with a view of the outside scene and of an image of an interior surface to be viewed including in combination, an image combiner having an optical axis, said combiner comprising a body of transparent material providing an inner generally concave curvilinear surface and an outer generally convex curvilinear surface, said outer surface having a lesser curvature than said inner surface and a partially reflecting film on said outer surface, means mounting said combiner between said observer and said outside scene with said inner surface adjacent to the observer, means mounting said surface to be viewed at a location below the combiner axis and below the line of sight in the field of said partially reflecting surface to provide the observer with a view of said image through said body, and an astigmatic optical element disposed between said interior surface and said combiner.

2. A viewing system as in claim 1 in which said astigmatic element is substantially an optical wedge.

3. A viewing system for presenting an observer having a line of sight with a view of the outside scene and of an image of an interior surface to be viewed including in combination, an image combiner having an optical axis, said combiner comprising a body of transparent material providing an inner generally concave curvilinear surface and an outer generally convex curvilinear surface, said outer surface having a lesser curvature than said inner surface and a partially reflecting film on said outer surface, means mounting said combiner between said observer and said outside scene with said inner surface adjacent to the observer, means mounting said surface to be viewed at a location below the combiner axis and below the line of sight in the field of said partially reflecting surface to provide the observer with a view of said image through said body, and a second body of transparent material having a generally concave curvilinear inner surface complementary to the outer surface of the first body and means for assembling said first and second bodies with an interface at said film.

4. A viewing system as in claim 3 in which said second body has a generally convex curvilinear outer surface to compensate for the lens effect of said first body.

5. In a viewing system, a unitary image combiner comprising a first body of transparent material having a generally concave curvilinear inner surface and a generally convex curvilinear outer surface, said outer surface having less curvature than said inner surface, a partially reflecting film on said outer surface, a partially reflecting film on said outer surface, a second body of transparent material having an inner generally concave curvilinear surface complementary to the outer surface of said first body and having an outer surface generally parallel to the inner surface of the first body, and means for assembling said first and second bodies with an interface at said film.

6. A viewing system for presenting an observer at a normal viewing position with a view of the outside scene including in combination, an image combiner having an optical axis, means mounting said combiner between said viewing position and the outside scene, an elongated device providing a viewing surface generally symmetrically arranged with respect to the longitudinal axis of the device, means mounting said device with said surface below the optical axis of said combiner and with said longitudinal axis making an acute angle with said combiner axis, and a generally wedge-shaped optical element for translating an image of said surface to said combiner, the narrow edge of said element being disposed adjacent said combiner axis.

7. A viewing system for presenting an observer having a line of sight with a view of the outside scene and of an image of an interior surface to be viewed including in combination, an image combiner having an optical axis, said combiner comprising a first body of transparent material having a generally concave curvilinear inner surface and a generally convex curvilinear outer surface, said outer surface having less curvature than said inner surface, a partially reflecting film on said outer surface, a second body of transparent material having an inner generally concave curvilinear surface complementary to the outer surface of the first body and an outer surface generally parallel to the inner surface of the first body and means for assembling said first and second bodies with an interface at said film, means mounting said combiner between said observer and said outside scene with said inner surface of the first body adjacent to the observer, an elongated device providing said interior surface generally symmetrically arranged with respect to the longitudinal axis of the device, means mounting said device with said surface below the optical axis of said combiner and with said longitudinal axis making an acute angle with said combiner axis, and a generally wedge-shaped optical element for translating an image of said interior surface to said combiner, the narrow edge of said element being disposed adjacent said combiner axis.

PO-1050
(5/69)

UNITED STATES PATENT OFFICE
CERTIFICATE OF CORRECTION

Patent No. 3,589,796      Dated June 29, 1971

Inventor(s) Carl F. Schaefer

It is certified that error appears in the above-identified patent and that said Letters Patent are hereby corrected as shown below:

Column 4, line 49:

Delete "a partially reflecting film on said outer surface,".

Signed and sealed this 15th day of February 1972.

(SEAL)
Attest:

EDWARD M. FLETCHER, JR.    ROBERT GOTTSCHALK
Attesting Officer    Commissioner of Patents